United States Patent Office 3,057,928
Patented Oct. 9, 1962

---

3,057,928
BIS(2-HYDROXY-META-ALKYL-PHENOL) ALKANES
Francis Frederick Koblitz, Erdenheim, and Paul Daniel Morton, Ambler, Pa., assignors to Pennsalt Chemicals Corporation, Philadelphia, Pa., a corporation of Pennsylvania
No Drawing. Filed Oct. 30, 1959, Ser. No. 849,737
9 Claims. (Cl. 260—619)

This invention relates to an improved route for the preparation of nuclear substituted (and particularly alkyl substituted) bis(hydroxyphenyl)alkanes from mono-substituted phenols in which the substituent contains four carbon atoms or more, and to new bis(hydroxyphenyl)-alkanes obtained thereby.

Nuclear alkylated bis(hydroxyphenyl)alkanes (also referred to as alkylated bisphenols) in which the alkyl substituent contains four or more carbon atoms are desired materials for the preparation of antioxidants and synthetic resins, and for numerous other uses. In the preparation of epoxy ether resins, for example they may be used to replace in part or entirely the unalkylated bisphenols [e.g. 2,2-bis-(4-hydroxyphenyl)propane] used in the preparation of the common commercial types of these resins. The $C_4$ or higher alkyl substituent confers oil solubility on the epoxy resin, making it more compatible with drying oils such as tung oil, linseed oil etc., thereby facilitating the use of the modified resin in drying oil-based varnishes and similar surface coatings.

As is well known, such bisphenols may be prepared by the condensation of the substituted phenol with an aldehyde or ketone in the presence of a condensation catalyst such as hydrochloric acid, or zinc oxide. Two phenol nuclei are joined through an alkylidene linkage provided by the aldehyde or ketone.

The preparation of such bisphenols by condensation of the mono-substituted phenol with an aldehyde, has in the past been quite difficult. The mono-substituted phenols employed as starting materials have been those in which the substituent is ortho or para to the hydroxy group such as ortho- or para-tertiary-butylphenol, para-octylphenol etc. Ordinarily, the cheaper, more available para isomer is employed. The condensation of such substituted phenols with aldehydes, and particularly with formaldehyde, tends to produce substantial amounts of trisphenols, tetrakisphenols and higher polymeric products. As a result, the aldehyde condensation products are often tarry complex mixtures from which it is difficult to separate bisphenols in good purity and yield. The relatively high melting point of many of the para-substituted phenols further complicates the condensation reaction by increasing the difficulty of separating the bisphenols from unreacted starting materials. Furthermore, when condensing the para-substituted phenols with an aldehyde, it is usually necessary to use a substantially anhydrous reaction medium because of the extreme sluggishness of the condensation reaction in the presence of any substantial amounts of water. This may require the use of a substantially anhydrous condensation catalyst, e.g. gaseous HCl or a dehydrating catalyst such as sulfuric acid and means that the unreacted alkylated phenol, after separation of the condensation products, must be thoroughly dried before being reused in a further condensation reaction. The same general difficulties are encountered in aldehyde condensations of ortho-alkylphenols.

In accordance with the present invention it has now been found that nuclear substituted bisphenols, and particularly alkyl substituted bisphenols, in which the substituent contains from 4 to about 20 carbon atoms may be readily prepared by a simple efficient process, with good yields of high purity product, by condensing a meta-substituted phenol of the formula

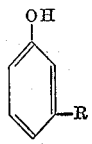

with an aldehyde such as formaldehyde, acetaldehyde, propionaldehyde, butyraldehyde, benzaldehyde etc. In the above formula, R is a monovalent alkyl, aryl, aralkyl or alkenyl radical containing from 4 to 20 carbon atoms and preferably from 4 to about 12 carbon atoms. It may if desired, contain substituents such as halogen and the like which do not react during the condensation reaction with the aldehyde.

Preferably, R is alkyl, particularly a branched chain alkyl group, especially a tertiary alkyl group. A tertiary alkyl group as used herein means an alkyl group attached to the aromatic nucleus through a tertiary carbon atom. Suitable alkylated phenols falling within this preferred class include, for example meta-tertiary-butylphenol, meta-n-butylphenol, meta-tertiary-amylphenol, meta-sec-amylphenol, meta-n-amylphenol, meta-cyclohexylphenol, meta-n-hexylphenol, meta-heptylphenol, meta-octylphenol, meta-nonylphenol, meta-dodecylphenol, etc. Halogen substituted alkylated phenols that may be employed include, for example, meta-(1,1-dimethyl-3-chloropropyl)phenol, meta - (1 - methyl - 1 - ethyl - 3 - chloropropyl)phenol and the like.

Suitable aryl or aralkyl meta-substituted phenols include particularly meta-phenylphenol; meta-(1-phenyl-1-ethyl)phenol; meta-(1-phenyl isopropyl)phenol; meta-(1-phenyl-2-propyl)phenol produced respectively by introducing a phenyl, styryl, an alpha-methyl styryl, or an allyl benzene group into a phenol nucleus at the meta position. Meta-(1-phenyl-1-ethyl)phenol is particularly preferred.

Suitable alkenyl substituted phenols include, for example, meta - (2 - methyl - 3 - butenyl)phenol; meta-(2 - methyl - 2 - propenyl)phenol; meta - (1 - methyl-4-pentenyl)phenol and the like.

It has been unexpectedly found that when using these meta-substituted phenols in contrast to similar para or ortho substituted phenols, there is no difficulty in controlling the condensation reaction with an aldehyde to obtain bisphenols to the substantial exclusion of gummy and tarry products and higher polynuclear phenols such as trisphenols, tetrakisphenols, etc. Furthermore, in many cases, the bisphenols obtained are limited to, or substantially limited to, one isomeric form rather than a plurality of isomers, thus greatly facilitating the production of a pure, uniform product. These results are obtained, furthermore, without the use of large excesses of phenol.

A further advantage obtained by the use of the meta-substituted phenol is that in many cases the bisphenols produced crystallize readily from the crude reaction mixture as they are formed and may be recovered readily by simply filtering the reaction mixture. Still another advantage of the meta-substituted phenols is their relatively lower melting point which in many cases obviates the need for carrying out the reaction in the presence of a solvent.

Still another advantage of using the meta-substituted phenols is that the condensation reaction with the aldehyde is generally not inhibited by the presence of substantial amounts of water, whereas as pointed out above, the condensation of the para-substituted phenols with aldehydes must often be carried out under substantially anhydrous conditions. Thus, in accordance with the invention, a cheap convenient catalyst such as concentrated aqueous hydrochloric may be employed. Furthermore, the tolerance to water of the meta isomer permits the crude reaction mixture remaining after filtering off bisphenol product to be repeatedly reused in further condensation reactions without drying to remove water. The ability to recycle unreacted phenol in the process of the invention is further facilitated by the fact that little gummy material is formed in the condensation. Using a para or ortho-substituted isomer on the other hand, is often necessary to extract and purify unreacted phenol from the crude reaction mixture before it can be reutilized in further condensation reactions.

While the invention does not depend upon any theoretical explanation for the widely different behavior of the meta isomer, it is believed that this may be due to steric hindrances produced by a relatively bulky substituent at the meta position. As explained in more detail below, it is believed that a $C_4$ or higher substituent at the meta position tends largely to block the para and to some extent the ortho position adjacent to the substituent, thus directing the condensation largely to one or two isomers, and in some cases exclusively to one isomer.

The meta-substituted phenol used in the present invention may be prepared by any desired method. Suitable methods for preparing such phenols are described, for example, in U.S. 2,193,760, to Dreisbach et al. A more economical method for preparing meta-substituted phenols involving the isomerization of the ortho or para isomer to the meta by heating the ortho or para isomer together with free phenol in the presence of a strong acid and an activated clay catalyst, is described in copending U.S. application Serial No. 716,564, filed February 21, 1958, by J. F. Olin, now U.S. Patent 3,014,079 issued December 19, 1961.

Aldehydes that may be used in the process of the invention are in general mono-functional (i.e. contains one aldehyde group) aldehydes having from 1 to 20, and preferably from 1 to 10 carbon atoms. The type of aldehyde employed is not critical as shown by numerous experiments with widely varying types of aldehydes. Thus, for example, the aldehyde may be a saturated aliphatic aldehyde such as formaldehyde, acetaldehyde, propionaldehyde, n-butyraldehyde, isobutyraldehyde, n-valeraldehyde, isovaleraldehyde, or higher aldehydes such as n-capronaldehyde, n-caprylaldehyde, n-undecylaldehyde, n-lauraldehyde, n-palmitaldehyde. It may be an unsaturated aldehyde such as acrolein, crotonaldehyde or the like. It may be an aromatic aldehyde such as benzaldehyde or naphthaldehyde. It may be a substituted aldehyde containing substituents such as halogen, mercapto, hydroxy, carboxy, ethoxy or nitro groups, such for example as chloral, chlorobenzaldehyde, nitrobenzaldehyde, bromobenzaldehyde, hydroxypivaldehyde

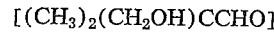

hydroxyacetaldehyde, para-hydroxybenzaldehyde, ortho-hydroxybenzaldehyde, vanillin, 2-hydroxy-1-naphthaldehyde and the like.

Aliphatic saturated aldehydes having from 1 to 6 carbon atoms represent a particularly preferred class for use in the invention.

The use of hydroxy substituted aldehydes such as hydroxypivaldehyde, or ortho or para-hydroxybenzaldehyde provides an additional hydroxy group in the bisphenol increasing the functionality of the molecule in reactions in which the hydroxy group participates. For example, in the production of epoxyether resins, the additional hydroxy groups introduced by the hydroxy-substituted aldehyde provides a trifunctional bisphenol increasing the opportunity for cross-linking in the final cure of the resin.

The use of a phenolic aldehyde such as hydroxy-benzaldehyde also increases the reactivity of the bisphenol obtained in further aldehyde or other similar type condensations by providing two additional reactive positions in the bisphenol molecule where condensation may take place. If for example para-hydroxybenzaldehyde is condensed with meta-tertiary-butylphenol, the alkylidene bridge provided by the para-hydroxybenzaldehyde contains two open reactive ortho positions.

The condensation reaction between the substituted phenol and the aldehyde is carried out in the presence of a condensation catalyst. Acidic condensation catalysts such as concentrated hydrochloric acid, anhydrous HCl, sulfuric acid, phosphoric acid, hydrofluoric acid; acid salts such as calcium chloride or the like, are preferred from the standpoint of economy, convenience, and since they generally give a higher yield of a better purity product. Concentrated hydrochloric acid is particularly preferred for the above reasons. It is cheap, convenient and produces a minimum of side reaction.

The nature of the condensation catalyst, however, is not critical, and if desired, neutral condensation catalysts such as zinc oxide may be employed. Alternatively, alkaline catalysts such as sodium or potassium hydroxide may be employed. Alkaline catalysts, however, are not preferred since the condensation is harder to control with a tendency for resinous and tarry products to be formed.

The amount of catalyst is not critical and may range as low as 0.05% (based on the amount of substituted phenol) to 5% for example. Optimum catalyst concentration will depend upon particular catalyst employed. With concentrated hydrochloric acid, for example, concentrations of from 0.01% to 20% generally give good results, while with zinc oxide best results are usually obtained by using concentrations of from 0.05% to 10%.

Depending upon the particular starting phenol and aldehyde, the reaction may in some cases be conducted without a solvent. In the case, for example, of the condensation of meta-tertiary-butylphenol with formaldehyde, the condensation occurs readily in the presence of hydrochloric acid or zinc oxide as a condensation catalyst to give good yields of bisphenols which crystallize readily from the reaction mixture. In many cases, however, it is desirable to carry out the condensation in the presence of a solvent. Preferred solvents for the reaction are those in which the substituted phenol is readily soluble but in which the bisphenol is insoluble or only sparingly soluble, such that the bisphenol can be readily crystallized from the reaction mixture. Where an acid catalyst is employed such as hydrochloric, it is also desirable that the solvent medium be one in which the acid is readily soluble. It is also desirable that the solvent be one which readily takes up water of reaction as it is formed. From these standpoints, a preferred solvent for carrying out the reaction is glacial acetic acid, this having the still further advantage that its acidic character tends to catalyze the condensation reaction. Less desirable solvent reaction media which may be used in place of or in conjunction with glacial acetic acid are xylene, toluene, petroleum ether and the like.

For efficient utilization of the reactants, the molar ratio of substituted phenol to aldehyde should be at least the stoichiometric ratio of 2:1. An excess of phenol, e.g. a phenol-aldehyde molar ratio up to 10:1 is usually desirable in order to suppress any tendency for the formation of higher polymeric products. Preferably, the phenol: aldehyde molar ratio is in the range of from 3:1 to 7:1.

In general, the reaction temperature may range from about 0° C. to 200° C., the optimum temperature depending upon the reactants, the catalyst employed and other factors such as whether or not a solvent is used. Using an acidic catalyst, such as concentrated HCl, the reaction temperature generally ranges from about 15° C. to 140° C. while with a less active catalyst such as zinc oxide somewhat higher temperatures in the range of from about 100° to 175° C. are preferable.

Reaction time is not critical and will usually range from as low as 15 minutes to as much as ten hours, for example, the usual reaction periods for good yields ranging between about 30 minutes and 6 hours.

In the majority of cases, the bisphenol condensation product crystallizes out of the reaction mixture and may be readily recovered by filtration. Crystallization may, if desired, be facilitated by seeding the reaction mixture, although this in many cases is not necessary. The readiness with which the meta-substituted bisphenols crystallize and are recovered from the reaction mixture in good purity is a salient feature of the invention, and is in sharp contrast to the behavior of the ortho and para-substituted isomers when attempting to prepare bisphenols from these by condensation with aldehydes.

In cases where a solvent is not employed in the condensation reaction, it may be desirable to dissolve the reaction mixture following the condensation reaction in a solvent such as xylene, glacial acetic acid, benzene, toluene, petroleum ether, ligroine, or mineral spirits before filtering off the bisphenol. The bisphenols are insoluble or only slightly soluble in such solvents at normal temperatures whereas the substituted phenols themselves and any resinous or tarry by-products are soluble. The diluted reaction mixture may then be filtered resulting in a clean separation of the bisphenol crystals from the unreacted phenol and aldehyde and any tarry or resinous by-products. Alternatively, where a reaction solvent is not employed, the bisphenols may be filtered directly from the reaction mixture and then washed in the cold with a solvent of the type listed above to remove occluded substituted phenol, formaldehyde, and by-products.

Where the reaction is conducted in the presence of a solvent such as glacial acetic acid, the crystallized bisphenols may be separated from the reaction mixture without diluting it and, if desired, after-washed with a solvent such as xylene, toluene etc. to remove any occluded reactants or by-products.

After recovery of the bisphenols from the reaction mixture, additional substituted phenol and aldehyde may be added to the reaction mixture together with additional condensation catalyst and the condensation reaction repeated. In many cases, the unreacted starting materials from a previous condensation may be repeatedly reused in this manner. The ability to thus recycle the unreacted starting materials without separating them from the crude reaction mixture is a further salient feature of the invention. This is made possible by virtue of the small amounts of resinous by-products formed when the meta-substituted phenols are employed and the fact that the condensation reaction proceeds in the presence of substantial amounts of water.

In carrying out the recycling operation, additional substituted phenol and aldehyde are added to the crude reaction mixture desirably in stoichiometric ratio, namely 2 moles of phenol to 1 of aldehyde since the reactants are consumed in the reaction in a substantially stoichiometric ratio. Thus when recycling is carried out it is only necessary to use a stoichiometric excess of substituted phenol in the initial reaction mixture, thus avoiding the cost and waste of handling large amounts of starting mixtures. As the reaction mixture is repeatedly reused, water of condensation tends to accumulate which gradually slows down the reaction rate. This may be counteracted by distilling off the water or by the addition of a dehydrating salt such as anhydrous calcium chloride, thus tending to improve the speed of the reaction and the yields obtained.

The products obtained in accordance with the invention are bis(hydroxyphenyl)alkanes of the formula:

(I) 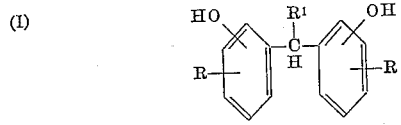

where $R^1$ is the residue of a mono-functional aldehyde having from 1 to 20 and preferably from 1 to 10 carbon atoms, where R is a substituent defined above, and in which the substituent R in each case is in a position meta to the hydroxy group.

Because the para position of the meta-substituted phenols employed in accordance with the invention is largely or almost completely blocked, as will be shown in more detail below, the predominant and in most cases the exclusive products of the condensation are ortho condensation products, namely bis(2-hydroxyphenyl)alkanes of the formula:

(II) 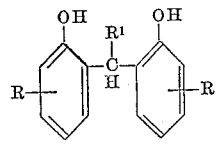

where $R^1$ and R are defined above and where the substituents R are each in a position meta to the hydroxy group.

It has further been found that one of ortho positions of the meta-substituted phenols employed in the invention (viz. that adjacent to the substituent R), is partially hindered and that it is accordingly possible to obtain essentially pure isomeric products in which the condensation occurs selectively at the one unhindered ortho position to give bis(2-hydroxyphenyl)alkanes of the formula:

(III) 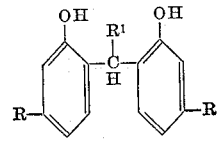

where R and $R^1$ are as defined above.

The extensive hindrance of the para position and the at least partial hindrance of one of the ortho positions of the meta-substituted phenols used in accordance with the invention is evidenced by the behavior of these substituted phenols in a variety of reactions. Blocking of the para position is shown by the fact that these substituted phenols do not form a nitroso derivative (which forms exclusively at the para position). The bisphenols formed from these meta-substituted phenols likewise do not form a nitroso derivative.

Blocking of the para position and at least partial hindrance of one of the ortho positions is further shown by the fact that these metal-substituted phenols will not form a thermoset gel even when heated with an excess of formaldehyde under strongly alkaline conditions. Furthermore, even when the thermoplastic resin prepared by long heating with formaldehyde under strongly alkaline conditions is then treated with hexamethylenetetramine no hardening of the resin to a thermoset condition occurs. When the para position and both ortho positions are open, a thermoset resin forms readily under these conditions.

A further indication that these meta-substituted phenols tend to react selectively at the unhindered ortho position is the fact that aldehyde condensations of these phenols produce predominantly compounds of identical melting points rather than a mixture of a higher melting para isomer and a lower melting ortho isomer. This is true whether the condensation is carried out in the presence of an acid catalyst such as hydrochloric acid which tends to strongly favor para condensations or a neutral catalyst such as zinc oxide which tends to favor ortho condensations.

The reactions of the bisphenols themselves obtained in accordance with the invention further shows the blocking of the para position and partial hindrance of one of the ortho positions. Thus, these bisphenols are unreactive toward formaldehyde indicating that the formaldehyde does not add at the para position and only to a limited extent at the ortho positions of the bisphenol. Similarly, a dinitro derivative does not appear to form, the nitration proceeding very slowly. Likewise, bromination of these bisphenols proceeds only very slowly to give well under two bromo substituents per bisphenol molecule.

As a consequence of the apparently hindered condition of two of the normally reactive positions on the phenol nucleus, the bisphenols formed are primarily these of formula III, particularly when conditions are controlled to favor these products (acid or neutral catalysis, larger than stoichiometric amounts of phenol, and relatively low temperatures). Products of this type readily isolated in essentially pure crystalline form by recrystallization, for example, of the product initially obtained. Typical bisphenols of this type that may be obtained in accordance with the invention are:

Bis(2-hydroxyphenyl-4-tertiary-butyl)methane
Bis(2-hydroxyphenyl-4-tertiary-amyl)methane
Bis(2-hydroxyphenyl-4-tertiary-octyl)methane
Bis(2-hydroxyphenyl-4-nonyl)methane
Bis(2-hydroxyphenyl-4-dodecyl)methane
1,1-bis(2-hydroxyphenyl-4-tertiary-butyl)ethane
1,1-bis(2-hydroxyphenyl-4-tertiary-butyl)propane
1,1-bis(2-hydroxyphenyl-4-tertiary-amyl)propane
1,1-bis(2-hydroxyphenyl-4-tertiary-butyl)-n-butane
1,1-bis(2-hydroxyphenyl-4-tertiary-butyl)-2-methylpropane
1,1-bis(2-hydroxyphenyl-4-tertiary-amyl)-2-methylpropane
1,1-bis(2-hydroxyphenyl-4-tertiary-octyl)-2-methylpropane
1,1-bis(2-hydroxyphenyl-4-tertiary-butyl)-1-phenylmethane
1,1-bis(2-hydroxyphenyl-4-tertiary-butyl)-1-(p-hydroxyphenyl)-methane
1,1-bis(2-hydroxyphenyl-4-tertiary-butyl)-2,2,2-trichloroethane
1,1-(2-hydroxyphenyl-4-tertiary-butyl)-2,2-dimethylpropane
1,1-bis(2-hydroxyphenyl-4-tertiary-butyl)-2,2-dimethyl-3-hydroxypropane
Bis(2-hydroxyphenyl-4-tertiary-butyl)-p-chlorophenylmethane
Bis(2-hydroxyphenyl-4-tertiary-butyl)-vinylmethane
Bis(2-hydroxyphenyl-4-tertiary-butyl)-allylmethane
Bis[2-hydroxyphenyl-4-(1-phenyl-1-ethyl)]methane
Bis[2-hydroxyphenyl-4-(1-phenyl-1-ethyl)]-2,2-dimethylethane
Bis[2-hydroxyphenyl-4-(1-phenyl isopropyl)]methane The bisphenols obtained in accordance with the invention are particularly useful as starting materials for the preparation of epoxy ether resins. By replacing the usual unalkylated bisphenols used in preparation of epoxy ether resins in whole or in part with the substituted bisphenols of the invention, epoxy resins that are readily oil-soluble may be obtained. The oil-solubility greatly increases the compatibility of the resin with drying oil such as tung oil, linseed oil, castor oil, dehydrated castor oil, and the like. This increased compatibility greatly facilitates the incorporation of the resin with the drying oil when preparing varnishes and the like. The common nonalkylated bisphenols are not oil-soluble and must be bodied (i.e. heated, stirred and oxidized) for long periods of time with the drying oil. The high degree of oil solubility of the bisphenols of the invention eliminates or greatly reduces the time required for the bodying operation.

In addition to increased oil solubility, the epoxy resins made with the substituted bisphenols of the invention have increased flexibility and impact resistance and improved chemical resistance, particularly resistance to water, acids and alkalies than the corresponding unsubstituted bisphenols.

Improved chemical resistance of epoxy resins prepared from the bisphenols of the invention results both from the presence of the nuclear substituents themselves and from their position on the nucleus. As pointed out above, the meta-substituted bisphenols of the invention are relatively unreactive toward strong chemical agents such as fuming nitric acid and the like apparently due to steric hindrances resulting from the bulky substituent at the meta position. Thus, epoxy ether resins prepared from the bisphenols of the invention are exceptionally resistant to agents such as nitrating agents, sulfonating agents, halogenating agents which would otherwise tend to attack reactive positions on the phenol nuclei.

The meta-substituted bisphenols prepared in accordance with the invention are also particularly suitable for the preparation of high quality epoxy ether resins in that these bisphenols may be prepared readily in essentially pure, crystalline form free from contamination with higher resinous and tarry products. Similar bisphenols prepared from the para and ortho-substituted isomers on the other hand are very difficult to prepare in a form free from higher polymeric colored products, which tends to produce resins of undesirable color. Furthermore, it is difficult using these other isomers to prepare bisphenols that are free from complex mixtures of isomers, such complex mixtures tending to give resins of non-uniform quality.

The meta-substituted bisphenols of the invention prepared by condensing a meta-substituted phenol, e.g. m-tert-butylphenol, with a hydroxy containing aromatic aldehyde, e.g. para-hydroxybenzaldehyde, are particularly useful in the preparation of oil-soluble chemically resistant phenolic resins for use in varnishes, molding resins etc. The additional reactive positions on the phenyl nucleus derived from the aromatic hydroxy aldehyde (e.g. the two ortho positions in the case of para-hydroxy benzaldehyde) provides additional functionality in condensation reactions, e.g. condensation with formaldehyde, permitting cross-linking to hard thermoset resins.

The following examples are intended to illustrate the invention:

EXAMPLE 1

*Condensation of Meta-Tertiary-Butyl Phenol With Formaldehyde*

300 grams (2 moles) of meta-tertiary-butylphenol, 25.2 grams of a 37.5% aqueous solution of formaldehyde (.33 mole) and .65 gram of zinc oxide are placed in a 500 milliliter three neck flask equipped with a reflux condenser, motor driven Teflon stirrer, thermometer and heating mantle. The reaction mixture is heated at reflux (105–110° C.) for 3½ hours. The reaction mixture is then decanted into a beaker and heated at 170° C. for 30 minutes to drive off the water of condensation. The reaction mixture is then filtered hot on a Büchner funnel to remove the zinc oxide. When the filtrate cools to 40° C. 100 grams of ligroin is added and the solution is cooled in a refrigerator to 5° C. over night. A cream colored precipitate forms which is filtered off on a Büchner funnel and washed with two 10 gram portions of ligroin. The product is recrystallized from xylene, filtered, washed with ligroin and dried overnight in an oven at 70° C. There is obtained 22 grams of white prisms having a melting point of 173–174° C., this being bis(2-hydroxyphenyl-4-tertiary-butyl) methane having the formula

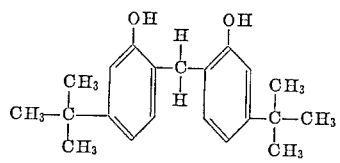

*Analysis.*—Calculated for $C_{21}H_{28}O_2$: C, 80.73; H, 9.03. Found: C, 80.92; H, 8.82. Molecular weight: calculated, 312; found, 326.

The infra-red spectrum of this compound in the 2,000 to 1,665 cm.$^{-1}$ wave length region shows absorption patterns characteristic only of 1,2,4 substitution of the benzene rings, viz. two bands of approximately equal intensity at 1872 cm.$^{-1}$ and 1722 cm.$^{-1}$, thus confirming the 2 and

EXAMPLE 2

*Condensation of Meta-Tertiary-Butylphenol and Formaldehyde*

A three neck flask equipped as in Example 1 is charged with 100 grams of meta-tertiary-butylphenol, 8.4 grams of aqueous 37½ percent formaldehyde, 15 grams of concentrated hydrochloric acid and 0.5 gram of thiovannic acid and 0.5 gram of thiourea as auxiliary catalysts. The reaction mixture is stirred and heated at reflux for 6 hours (118° C.). The reaction mixture is cooled to 60° C. and 100 grams of ligroin is added. The mixture is allowed to stand overnight and then filtered, the solids washed with ligroin and recrystallized from xylene yielding about 8 grams of white prisms having a melting point of 173°–174° C., this being bis(2-hydroxyphenyl-4-tertiary-butyl) methane, the same product obtained in Example 1. A mixture of this product and that of Example 1 shows no depression in melting point, the mixture melting at 173°–174° C. The infra-red spectra of the products of Examples 1 and 2 are identical.

EXAMPLE 3

*Condensation of Meta-Tertiary-Butylphenol With Formaldehyde With Recycling of the Reactants*

A three neck flask equipped as in Example 1 is charged with 6.0 grams (0.2 mole) of paraformaldehyde, 120.0 grams (0.8 mole) of meta-tertiary-butyl phenol, 200 grams of glacial acetic acid and 20.0 grams of concentrated hydrochloric acid. This mixture is stirred at room temperature for 6 hours. It is left to stand overnight and then filtered. 7.2 grams of white crystals of bis(2-hydroxyphenyl-4-tertiary-butyl)methane is obtained (a yield of 11.5% based on formaldehyde).

To the filtrate from the first cycle there is added 60 grams (0.4 mole) of meta-tertiary-butyl phenol and 6.0 grams (0.2 mole) of paraformaldehyde, these materials being added in their stoichiometric ratio. The mixture is again stirred at room temperature for an additional 6 hours after which it is left standing for 2 hours to permit the product to crystallize, and filtered. 22.6 grams of the same bisphenol (36.2 percent yield based on formaldehyde) is recovered from the second cycle.

The cycle is repeated a third time in a manner similar to the second cycle, 14.3 grams of the same bisphenol (22.9 percent yield based on formaldehyde) being obtained.

On the fourth cycle, 20.0 grams of anhydrous calcium chloride is added together with the 60 grams of meta-tertiary-butyl phenol and 6 grams of paraformaldehyde. From the fourth cycle 91.4 grams of the same bisphenol (73.2 percent yield based on formaldehyde) is obtained.

EXAMPLE 4

*Condensation of Meta-Tertiary-Butyl Phenol With Formaldehyde With Recycling of the Reactants*

A three neck flask equipped as in Example 1 is charged with 16.0 grams of formalin (37 percent aqueous formaldehyde) (0.2 mole), 120 grams of meta-tertiary-butyl phenol (0.8 mole) 200 grams of glacial acetic acid and 20.0 grams of concentrated hydrochloric acid. This mixture is heated at reflux (about 105° C.) for 6 hours, after which it is cooled to permit the product to crystallize. On the first cycle a yield of more than 90% of bis-(2-hydroxyphenyl-4-tertiary-butyl)methane is obtained.

To the filtrate from the first cycle there is added 60 grams (0.4 mole) of meta-tertiary-butyl phenol and 16.0 grams of 37 percent aqueous formaldehyde (0.2 mole) and the same reaction procedure is repeated. From the second cycle there is obtained at 96.5 percent yield of the same bisphenol.

EXAMPLE 5

*Reaction of Bis(2-Hydroxyphenyl-4-Tertiary-Butyl)-Methane With Sodium Nitrite*

In an attempt to prepare a nitroso derivative of the bisphenol of Example 1, 4 grams of that bisphenol is dissolved in 10 cc. of methanol. To this solution there is added dropwise with stirring a solution of 10 grams of sodium nitrite in 100 cc. 10% HCl in water solution at room temperature. No reaction occurs.

The same procedure is repeated with recrystallized meta-tertiary-butyl phenol with similar results. The meta-tertiary-butyl phenol does not react. The failure of meta-tertiary-butyl phenol and its bisphenol to form a nitroso derivative, which forms exclusively at the para position, indicates strong hindrance at the para position probably due to the steric effect of the bulky meta-substituent.

EXAMPLE 6

*Nitration of Bis(2-Hydroxyphenyl-4-Tertiary-Butyl)-Methane*

1 part of mercury is dissolved in 2 parts of fuming nitric acid and then diluted with 2 parts of water. To this reagent there is added 0.04 part of bis(2-hydroxyphenyl-4-tertiary-butyl)methane. The original cream colored solid changes slowly to yellow on strong heating but does not dissolve indicating very slow and only partial nitration of the bisphenol.

EXAMPLE 7

*Condensation of Meta-Tertiary-Butyl Phenol and Acetaldehyde*

100 grams (0.67 mole) of recrystallized meta-tertiary-butyl phenol, 8.8 grams (0.2 mole) of acetaldehyde, 20 grams of concentrated hydrochloric acid and 20 grams of water are charged to a 300 milliliter round bottomed three-necked flask equipped as in Example 1. The reaction mixture is stirred vigorously and refluxed at 95° to 100° C. for 4 hours. The reaction mixture is cooled to room temperature with stirring and the water phase is decanted off. The solid phase remaining is washed by decantation 4 times with water and then diluted with 50 grams of ligroin. The mixture is then filtered on a Büchner funnel, sucked dry, and washed with ligroin. The solid product is dissolved in xylene, filtered hot and then crystallized.

The product is filtered off, washed with ligroin and dried at 80° C. 57 grams (87% yield based on acetaldehyde) of a white crystalline product is obtained having a melting point of 208 to 209° C., this being 1,1-bis(2-hydroxyphenyl-4-tertiary-butyl)ethane of the formula:

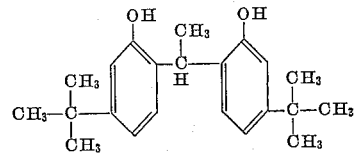

*Analysis.*—Calculated for $C_{22}H_{30}O_2$: C, 80.93; H, 9.26. Found: C, 81.47; H, 9.30.

EXAMPLE 8

*Condensation of Meta-Tertiary-Butyl Phenol With Propionaldehyde*

100 grams (0.67 mole) of recrystallized meta-tertiary-butyl phenol, 11.6 grams (0.2 mole) of propionaldehyde, 20 grams of concentrated hydrochloric acid and 20 grams of water are placed in a 300 milliliter round bottom, three necked flask equipped as in Example 1. The reaction is stirred vigorously and refluxed at 95 to 100° C. for 4 hours and then cooled to room temperature with stirring and the water phase decanted off. The gummy solid phase is washed by decantation four times with water and then diluted with 50 grams of ligroin. The mixture is then filtered on a Büchner funnel, sucked dry, and washed with three 20 milliliter portions of ligroin. The solid product is dissolved in 400 cc. of xylene, filtered hot, and crystallized. The product is filtered off, washed twice with ligroin, and dried for 12 hours at 80° C.

There is obtained 49 grams (72% yield based on propionaldehyde) of a white crystalline product having a melting point of 205–206° C., this being 1,1-bis(2-hydroxyphenyl-4-tertiary-butyl)propane of the formula:

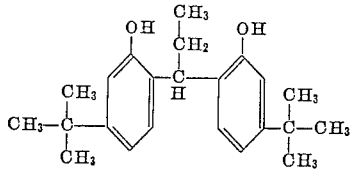

Analysis.—Calculated for $C_{23}H_{32}O_2$: C, 81.13; H, 9.47. Found: C, 81.33; H, 9.15.

EXAMPLE 9

*Nitration of 1,1-Bis(2-Hydroxyphenyl-4-Tertiary-Butyl)-Pronane*

Approximately 3 grams of the bisphenol of Example 8 is dissolved in 10 cc. of methanol. Concentrated nitric acid is added drop-wise until approximately 10 milliliters has been added. The mixture is then heated to boiling and cooled for 5 minutes. The dark brown solids are filtered off after diluting the mixture with 20 cc. of water. The solids are washed twice on the filter with 20 cc. portions of water.

The product is dissolved in denatured alcohol, filtered hot, and allowed to crystallize. It is then filtered off, sucked dry, and washed with about 5 cc. of ice-cold methanol. The light yellow product is recrystallized from alcohol in the same manner. A light yellow product is obtained having a melting point of 192–193° C. On analysis this is found to contain 5.47% nitrogen showing the presence of 1.68 nitro ($NO_2$) groups per mole. The slow rate at which the nitration occurs and the fact that only partial nitration occurs (less than two nitro groups per mole against four unsubstituted ortho and para positions) shows that at least two of these positions are essentially blocked with respect to nitration and that the other two are at least partially hindered.

EXAMPLE 10

*Condensation of Metatertiary Butylphenol With n-Butyraldehyde*

A 300 milliliter round bottom three necked flask equipped as in Example 1 is charged with 100 grams (0.67 mole) of metatertiary butyl phenol, 14.4 grams (0.2 mole) of n-butyraldehyde, 10 grams of concentrated hydrochloric acid and 10 grams of water. This mixture is stirred vigorously and refluxed at 95 to 100° C. for 4 hours. The reaction mixture is cooled to room temperature with stirring and the water phase decanted off. The solid phase is washed by decantation four times with water and then diluted with 50 grams of ligroin.

The product is recrystallized from hot n-heptane and 8 grams of a white crystalline product having a melting point of 164.5 to 165.5° C. is obtained, this being 1,1-bis-(2-hydroxyphenyl-4-tertiary-butyl)butane of the formula:

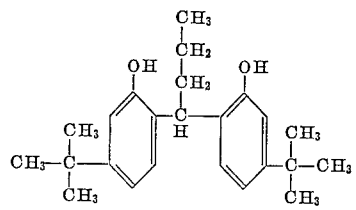

It is notable that the melting point of this compound (165–165° C.) is considerably lower than the melting point of the bisphenol prepared in Example 11 from isobutyraldehyde which has a melting point of 214° to 216° C.

EXAMPLE 11

*Condensation of Meta-Tertiary-Butyl Phenol With Isobutyraldehyde*

100 grams of meta-tertiary-butyl phenol, 14.4 grams (0.2 mole) of isobutyraldehyde, 10 grams of concentrated hydrochloric acid and 10 grams of water are placed in a 300 milliliter round bottomed three-necked flask equipped as in Example 1. The mixture is stirred vigorously and refluxed at about 95 to 100° C. for 4 hours. The reaction mixture is cooled to room temperature with stirring and the water phase is decanted off. After washing with water the reaction mixture is diluted with ligroin, filtered after which the solid product is dissolved in hot xylene, filtered and crystallized.

After recrystallization twice from xylene and washing with n-heptane, 53 grams (75% yield based on isobutyraldehyde) of a white crystalline product is obtained having a melting point of 214–216° C., this being 1,1-bis(2-hydroxyphenyl-4-tertiary-butyl)-2-methyl-propane of the formula:

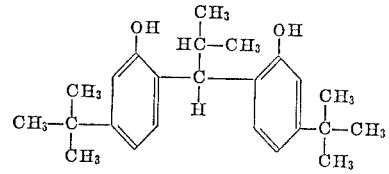

Analysis.—Calculated for $C_{24}H_{34}O_2$: C, 81.31; H, 9.67. Found: C, 81.92; H, 9.08.

The infrared spectrum of this compound is similar to that of the products of Examples 1 and 2. It shows absorption patterns in the 2000 to 1665 cm.$^{-1}$ wave length regions characteristic only of 1,2,4-substitution of the benzene ring, viz. two bands of approximately equal intensity at 1873 cm.$^{-1}$ and 1722 cm.$^{-1}$ thus, confirming the position of the substituents as shown in the above formula.

EXAMPLE 12

*Condensation of Meta-Tertiary-Butyl Phenol With Isobutyraldehyde With Recycling of the Reactants*

A 1 liter three-necked flask equipped with stirrer, thermometer and reflux condenser is charged with 14.4 grams (0.2 mole) of isobutyraldehyde, 120 grams (0.8 mole) of meta-tertiary-butyl phenol, 200 grams of glacial acetic acid and 20 grams of concentrated hydrochloric acid. This reaction mixture is stirred without application of heat for 4 hours, after which it is set aside to allow the product to crystallize. The crystalline product is then filtered off and washed wtih 25 milliliters of glacial acetic acid following which the glacial acetic acid used for this washing is added to the filtrate. The crystals are then washed with 100 milliliters of n-heptane and then dried on a porous plate for about 4 hours in an 80° C. oven. From this first cycle, there is obtained 57 grams (80.5% yield based on isobutyraldehyde) of 1,1-bis(2-hydroxyphenyl-4-tertiary-butyl)-2-methylpropane.

To the filtrate from the first cycle there is added 60 grams (0.4 mole) and 14.4 grams (0.2 mole) of isobutyraldehyde (stoichiometric ratio of phenol:aldehyde). The second mixture is stirred for an additional four hours without application of heat and then set aside to permit the product to crystallize after which the mixture is filtered and the crystalline product washed as in the first cycle. From the second cycle there is obtained 54.7 grams (77.4% yield based on isobutyraldehyde) of the same bisphenol obtained in the first cycle.

EXAMPLE 13

Condensation of Meta-Tertiary-Butyl Phenol With Isobutyraldehyde With Recycling of the Reactants A 1 liter flask equipped as in Example 12 is charged with 14.4 grams (0.2 mole) of isobutyraldehyde, 120 grams (0.8 mole) of meta-tertiary-butyl phenol, 200 grams of glacial acetic acid and 20.0 grams of concentrated hydrochloric acid. This reaction mixture is stirred for 4 hours without application of heat and then set aside to permit the product to crystallize after which the crystalline produc is filtered off, washed with 25 milliliters of glacial acetic acid which is added to the filtrate following the washing operation, after which the crystals are washed with 100 milliliters of n-heptane. After drying in the oven at 80° C. for 4 hours there is obtained 49.5 grams (70% yield based on isobutyraldehyde) of white crystals of 1,1 - bis(2 - hydroxyphenyl-4-tertiary-butyl)-2-methyl-propane.

Following the procedures described above, the first cycle is repeated an additional 7 times. In each case, the filtrate remaining after filtering off the crystalline product from the preceding cycle is recharged into the reaction flask together with 60 grams (0.4 mole) of meta-tertiary-butylphenol and 14.4 grams (0.2 mole) of isobutyraldehyde (stoichiometric ratio of phenol: aldehyde). The amount of product and the yield (based on isobutyraldehyde) obtained in each of these cycles is as follows:

| Cycle | Grams | Yield, percent |
|---|---|---|
| Second | 51.2 | 72.4 |
| Third | 57.9 | 81.8 |
| Fourth | 43.2 | 61.0 |
| Fifth | 66.6 | 94.2 |
| Sixth | 14.8 | 20.9 |
| Seventh | 51.5 | 72.8 |
| Eighth | 24.1 | 29.4 |

The filtrate remaining after the eighth cycle is charged back into the reaction flask without additional reactants, stirred with application of heat at reflux for 8 hours, cooled and filtered to give an additional yield of 40 grams of the same bisphenol.

EXAMPLE 14

Condensation of Meta-Tertiary-Butyphenol and Benzaldehyde

A three necked flask equipped as in Example 1 is charged with 10.6 grams (0.1 mole) of benzaldehyde and 50 grams (0.33 mole) of meta-tertiary-butylphenol, 10 grams of concentrated hydrochloric acid and 10 grams of water. This mixture is heated and stirred at reflux for six hours after which it is cooled to room temperature, washed twice with water, once with saturated sodium carbonate and twice more with water and then diluted with 100 cc. of ligroin.

The reaction mixture is filtered and the solids on the filter are washed twice with ligroin and are then dissolved in hot xylene. The solution is then filtered hot, allowed to crystallize, and the crystals filtered off. The crystals are washed twice on the filter with ligroin and then recrystallized from xylene. A powdery white crystalline product is obtained consisting of 12 grams (32% yield based on benzaldehyde) of bis(2-hydroxyphenyl-4-tertiary-butyl)phenyl methane of the formula:

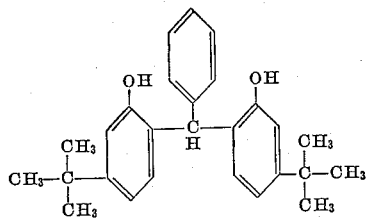

EXAMPLE 15

Condensation of Meta-Tertiary-Butylphenol and Hydroxy-Pivaldehyde

A three necked flask, equipped as in Example 1, is charged with 28 grams (0.1 mole) of a 36.1% aqueous solution of hydroxy-pivaldehyde

50 grams (0.33 mole) of meta-tertiary-butylphenol, 10 grams of concentrated hydrochloric acid and 200 cc. of glacial acetic acid. This mixture is stirred and refluxed for 6 hours after which the reaction mixture is cooled to room temperature, washed twice with water, once with saturated sodium carbonate and twice more with water. The product is then diluted with 100 cc. of ligroin, filtered, washed twice on the filter with ligroin and then dissolved in boiling xylene. The xylene solution is filtered hot, allowed to crystallize, filtered again and washed twice on the filter with ligroin. It is then recrystallized from xylene and dried over night at 80° C. The product obtained consists of 4 grams (16% yield based on hydroxy-pivaldehyde) of powdery white crystals consisting of 1,1 - bis(2 - hydroxyphenyl-4-tertiary-butyl)2,2-dimethyl-3-hydroxypropane of the formula:

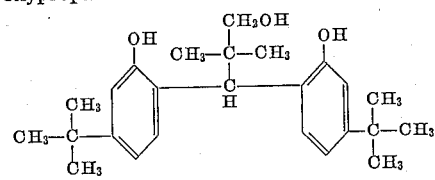

EXAMPLE 16

Condensation of Meta-Tertiary-Butylphenol With Parahydroxy-Benzaldehyde

A three necked flask equipped as in Example 1 is charged with 100 grams (0.67 mole) of meta-tertiary-butylphenol, 24.4 grams (0.2 mole) of parahydroxybenzaldehyde, 20 grams of concentrated hydrochloric acid and 20 grams of water. This mixture is heated and stirred at reflux for 6 hours after which the reaction mixture is cooled to room temperature, washed with water and saturated sodium carbonate and then diluted with 100 cc. of ligroin. The reaction mixture is then set aside to crystallize, filtered and the crystalline product recrystallized from xylene. A white crystalline powder is obtained consisting of bis(2-hydroxyphenyl-4-tertiary-butyl)-parahydroxyphenyl-methane of the formula:

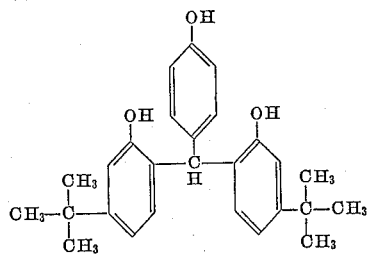

EXAMPLE 17

Condensation of Meta-Tertiary-Butylphenol With Acrolein

A three necked flask equipped as in Example 1 is charged with 300 grams (2 moles) of meta-tertiary-butylphenol, 11.2 grams (0.2 mole) of acrolein and 0.5 gram zinc oxide and the mixture is stirred vigorously while heated at reflux (105 to 110° C.) for six hours, and is then decanted into a beaker, and heated to 160° C. for 30 minutes. The mixture is then allowed to stand at room temperature overnight, after which 50 grams of xylene and 50 grams of ligroin are added and mixed thoroughly. The reaction mixture is filtered on a Büchner funnel, the solids are retained and the filtrate is heated to 160° C. to drive off the solvents. 100 grams of metatertiary-butylphenol, 6 grams of acrolein and 0.5 gram of zinc oxide are added to the filtrate and this is heated and stirred a further 6 hours as in the first cycle. The reaction mixture is carried through the rest of the cycle; the solids are retained and the liquids are recycled a third time. The solid materials obtained from the three cycles are dissolved in hot xylene, filtered and cooled after which the crystals thus obtained are recrystallized twice from xylene. A white crystalline product is obtained consisting of 1,1-bis(2-hydroxyphenyl-4-tertiary-butyl)-2-propene of the formula:

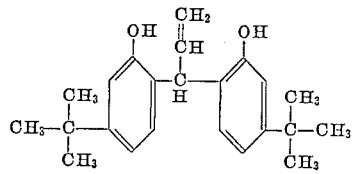

EXAMPLE 18

*Condensation of Meta-Tertiary-Amyl Phenol and Formaldehyde*

A three necked flask equipped as in Example 1 is charged with 200 grams (1.2 moles) of meta-tertiary-amyl phenol, 32 grams (0.4 mole) of aqueous 37½% formaldehyde, 200 grams of glacial acetic acid, 200 grams of concentrated hydrochloric acid and 10 grams of anhydrous calcium chloride. The reaction mixture is stirred and heated at reflux temperature for 6 hours and then cooled overnight at room temperature. The reaction mixture is then cooled and filtered, the solids on the filter being washed with ligroin and dried to provide a product consisting of bis(2-hydroxyphenyl-4-tertiary-amyl)methane of the formula:

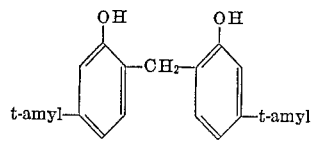

EXAMPLE 19

*Condensation of Meta-Secondary-Amyl-Phenol With Isobutyraldehyde*

A three necked flask equipped as in Example 1 is charged with 100 grams of meta-secondary-amyl phenol, 14.6 grams (0.2 mole) of isobutyraldehyde, 10 grams of concentrated hydrochloric acid and 10 grams of water. The mixture is stirred vigorously and refluxed (85 to 100° C. for about 4 hours) after which the reaction mixture is cooled to room temperature with stirring and the water phase is decanted off. The reaction mixture is washed with water, diluted with ligroin, filtered, after which the solid product is dissolved in hot xylene, filtered and then recrystallized from xylene. A white crystalline product is obtained consisting of 1,1-bis(2-hydroxyphenyl-4-secondary amyl)-2-methyl propane of the formula:

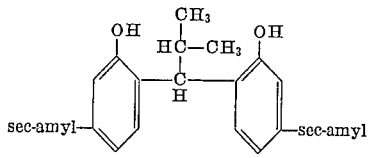

EXAMPLE 20

*Condensation of Meta-Tertiary-Hexylphenol and Isobutyraldehyde*

A 300 milliliter three necked flask equipped as in Example 1 is charged with 110 grams of meta-tertiary-hexylphenol, 14.4 grams (0.2 mole) of isobutyraldehyde, 10 grams of concentrated hydrochloric acid and 10 grams of water and this reaction mixture stirred vigorously and refluxed at about 95 to 100° C. for 6 hours. The reaction mixture is then cooled to room temperature with stirring and the water phase is decanted off. The mixture is then washed with water, diluted with ligroin, filtered and the solid product dissolved in hot xylene, filtered again and then recrystallized twice from xylene. A white crystalline product is obtained consisting of 1,1-bis-(2-hydroxyphenyl-4-tertiary-hexyl)-2-methylpropane of the formula:

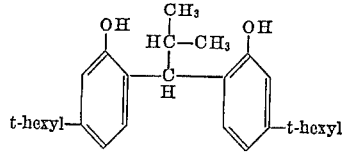

EXAMPLE 21

*Condensation of Meta-Styryl Phenol and Formaldehyde*

A 300 milliliter three necked flask equipped as in Example 1 is charged with 198 grams (1.0 mole) of meta-styryl phenol, 16 grams (0.2 mole) of a 37½% aqueous solution of formaldehyde, and 10 grams of concentrated hydrochloric acid. This mixture is stirred and refluxed at about 95 to 105° C. for 6 hours. The mixture is then cooled to room temperature with stirring, the water phase separated, and the organic phase washed with water, diluted with ligroin, and filtered, after which the solid product is dissolved in hot xylene, filtered, and then recrystallized from xylene. A white crystalline product is obtained consisting of bis[2-hydroxyphenyl-4-(1-phenyl-1-ethyl)]methane having the formula:

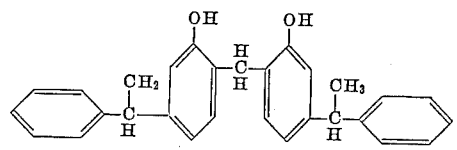

EXAMPLE 22

*Condensation of Meta-Tertiary-Octyl Phenol With Propionaldehyde*

A 300 milliliter three necked flask equipped as in Example 1 is charged with 150 grams of meta-tertiary-octyl phenol, 11.6 grams (0.2 mole) of propionaldehyde, 20 grams of concentrated hydrochloric acid and 20 grams of water. The reaction mixture is stirred vigorously and heated at reflux (95 to 100° C.) for 6 hours and then cooled to room temperature with stirring after which the water phase is decanted off. The mixture is washed with water and then diluted with ligroin after which it is filtered on a Büchner funnel washed with ligroin, dissolved in hot xylene, filtered and then crystallized. After recrystallization twice from xylene, a white crystalline product is obtained, consisting of 1,1-bis(2-hydroxy-phenyl-4-tertiary-octyl)propane of the formula:

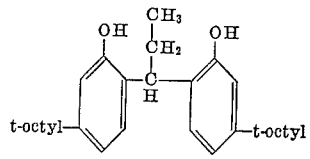

We claim:
1. Bis(2-hydroxyphenyl)alkanes of the formula:

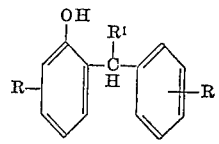

where R is a monovalent hydrocarbon radical selected from the class consisting of alkyl and phenylalkyl radicals having from 4 to 12 carbon atoms; where each substituent R is in a position meta to the hydroxy group; and where $R^1$ is selected from the class consisting of hydrogen; aliphatic hydrocarbon radicals free from triple bonds and having from 1 to 10 carbon atoms; aromatic hydrocarbon radicals having from 6 to 10 carbon atoms; substituted aliphatic hydrocarbon radicals free from triple bonds and having from 1 to 10 carbon atoms containing a substituent selected from the class consisting of chlorine, bromine, hydroxy and nitro substituents; and substituted aromatic hydrocarbon radicals having from 6 to 10 carbon atoms containing a substituent selected from the class consisting of chlorine, bromine, hydroxy and nitro substituents.

2. Bis(2-hydroxyphenyl)alkanes of the formula:

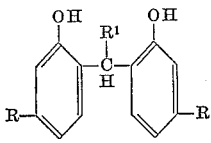

where R is a monovalent hydrocarbon radical selected from the class consisting of alkyl and phenylalkyl radicals having from 4 to 12 carbon atoms; where each substituent R is in a position meta to the hydroxy group; and where $R^1$ is selected from the class consisting of hydrogen; aliphatic hydrocarbon radicals free from triple bonds and having from 1 to 10 carbon atoms; aromatic hydrocarbon radicals having from 6 to 10 carbon atoms; substituted aliphatic hydrocarbon radicals free from triple bonds and having from 1 to 10 carbon atoms containing a substituent selected from the class consisting of chlorine, bromine, hydroxy and nitro substituents; and substituted aromatic hydrocarbon radicals having from 6 to 10 carbon atoms containing a substituent selected from the class consisting of chlorine, bromine, hydroxy and nitro substituents.

3. Compounds in accordance with claim 2 in which $R^1$ is substituted and in which the substituent is a hydroxy group.

4. Compounds in accordance with claim 2 in which R is tertiary butyl group.

5. The compound bis(2-hydroxyphenyl-4-tertiary-butyl)methane of the formula:

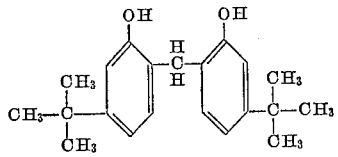

6. The compound 1,1-bis(2-hydroxyphenyl-4-tertiary-butyl)ethane of the formula:

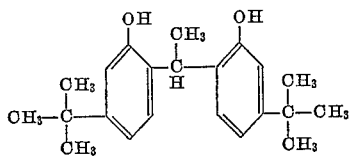

7. The compound 1,1-bis(2-hydroxyphenyl-4-tertiary-butyl)propane of the formula:

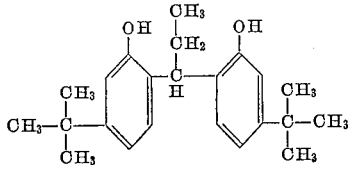

8. The compound 1,1-bis(2-hydroxyphenyl-4-tertiary-butyl)butane of the formula:

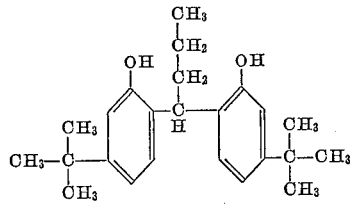

9. The compound 1,1-bis(2-hydroxyphenyl-4-tertiary-butyl)-2-methylpropane of the formula:

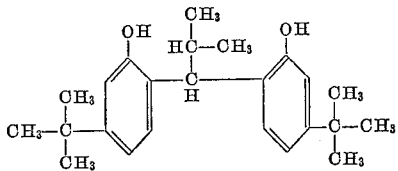

References Cited in the file of this patent

UNITED STATES PATENTS

| | | |
|---|---|---|
| 2,468,982 | Jansen | May 3, 1949 |
| 2,623,908 | Stoesser et al. | Dec. 30, 1952 |
| 2,636,905 | Kehe et al. | Apr. 28, 1953 |
| 2,647,102 | Ambelang | July 28, 1953 |
| 2,791,616 | Luten | May 7, 1957 |
| 2,798,079 | Linn | July 2, 1957 |
| 2,877,210 | Bankert | Mar. 10, 1959 |
| 2,919,294 | Beaver et al. | Dec. 29, 1959 |
| 2,932,671 | Hager et al. | Apr. 12, 1960 |

FOREIGN PATENTS

| | | |
|---|---|---|
| 480,524 | Canada | Jan. 22, 1952 |

OTHER REFERENCES

Sugimoto: Chem. Abstr., vol. 25 (1931), 3322, 3323 (2 pages), (Pat. Off. Lib.).

UNITED STATES PATENT OFFICE
CERTIFICATE OF CORRECTION

Patent No. 3,057,928

October 9, 1962

Francis Frederick Koblitz et al.

It is hereby certified that error appears in the above numbered patent requiring correction and that the said Letters Patent should read as corrected below.

In the heading to the printed specification, lines 2 and 3, title of invention, for "BIS(2-HYDROXY-META-ALKYL-PHENOL) ALKANES" read -- BIS(2-HYDROXY-META-ALKYLPHENYL) ALKANES --; column 4, line 28, for "0.01%" read -- 0.1% --; column 6, line 43, for "metal-" read -- meta- --; column 9, line 74, for "at" read -- a --; column 11, line 22, for "Pronane", in italics, read -- Propane --, in italics; line 74, for "(165-165° C.)" read -- (164-165° C.) --; column 13, line 12, for "produc" read -- product --; column 16, lines 63 to 68, the formula should appear as shown below instead of as in the patent:

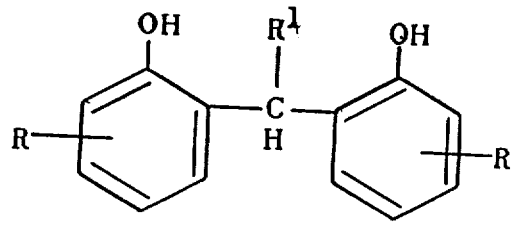

Signed and sealed this 19th day of March 1963.

(SEAL)
Attest:

ESTON G. JOHNSON
Attesting Officer

DAVID L. LADD
Commissioner of Patents